April 21, 1970     H. A. ZOLLINGER     3,507,406
ARTICLE CONVEYING AND HANDLING APPARATUS
FOR RACK STORAGE SYSTEMS
Filed March 28, 1968     4 Sheets-Sheet 3

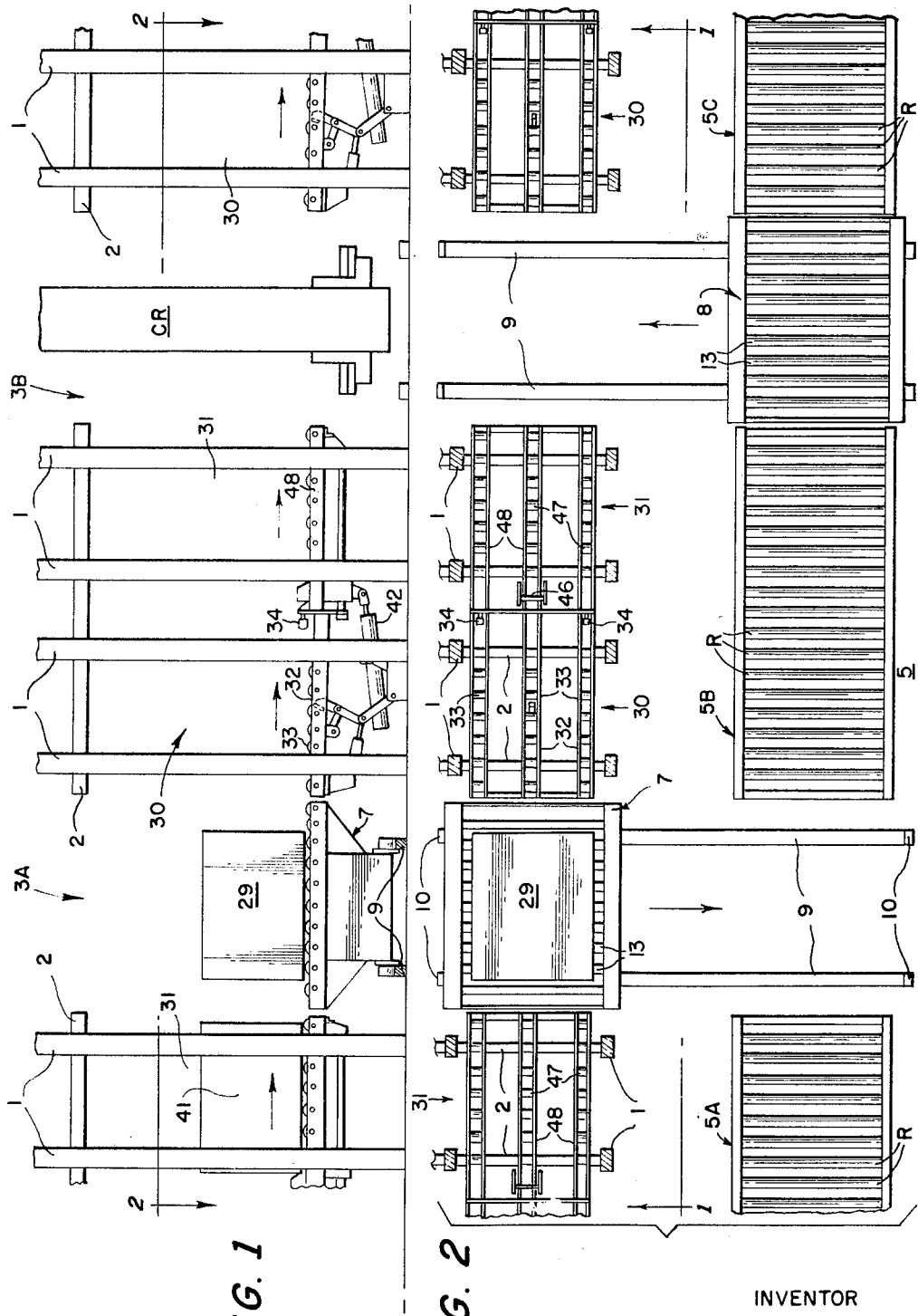

United States Patent Office 3,507,406
Patented Apr. 21, 1970

3,507,406
ARTICLE CONVEYING AND HANDLING APPARATUS FOR RACK STORAGE SYSTEMS
Howard A. Zollinger, Williamsville, N.Y., assignor to Westinghouse Electric Corporation, Pittsburgh, Pa., a corporation of Pennsylvania
Filed Mar. 28, 1968, Ser. No. 716,842
Int. Cl. B65g 1/04, 47/10
U.S. Cl. 214—16.4                          10 Claims

ABSTRACT OF THE DISCLOSURE

Articles move to and from a rack storage system along a conveyor which extends past the ends of parallel storage racks having intermediate access aisles which extend transversely relative to the conveyor line. Motorized segments of the conveyor move laterally between their normal locations in the conveyor line and buffer locations that are within adjacent aisles and between input and output rack storage bins. Article-moving means on said segments discharge articles therefrom into the input storage bins, and article-moving means at said output storage bins discarge articles therefrom to said segments, so that articles are transferred between said normal and buffer locations.

BACKGROUND OF THE INVENTION

This invention relates to stacker crane and rack storage systems, and more particularly to a new and improved transfer car buffer system for transferring articles to be stored to the storage system and for withdrawing articles from the storage system.

Typical rack storage systems of the type to which the present invention relates comprise high rise storage racks filling the high bay area of a warehouse more or less completely, each rack having bins or compartments capable of receiving and holding articles to be stored (e.g., palletized loads). The open ends of these bins face each other across access aisles which extend between each two adjacent racks. Any of these bins can be served for deposit therein and withdrawal therefrom of articles by aisle type stacker crane means capable of moving lengthwise of the aisle on overhead rails or the like and including a suitable hoist that can be lowered to the level of any bin for depositing a palletized load in or withdrawing it from a bin. High rise rack storage systems of this general type are well known.

The palletized loads or other articles to be stored usually move to the storage system on a roller conveyor extending more or less horizontally past the ends of the racks and the intermediate access aisles, and it is necessary to transfer the articles laterally from the conveyor line to the storage system. Heretofore, articles have been removed from the conveyor (or from some other source of supply) by transfer means which deposit them at an intermediate location commonly referred to as a buffer station, where the articles can be picked up by the stacker crane mechanism as already described. A second such buffer station and transfer means are usually provided for the reverse operation of withdrawing articles from storage and transferring them to the conveyor.

In general, input and output buffer stations have been provided at the ends of the storage racks, one such station on either side of an intermediate access aisle. The station itself may comprise nothing more than a supporting framework on which articles can be deposited. In some cases the transfer means may be only an ordinary fork truck operating between the conveyor and the buffer station. In other cases laterally extending chain type conveyors have been used as transfer means, and in still other cases small laterally moving transfer cars have been used.

The location of the buffer stations at the ends of the racks, with the consequent necessity for travel of the stacker crane mechanism beyond the ends of the storage racks to points above the buffer stations, has caused a substantial waste of storage space between the ends of the storage racks and the adjacent end walls of the high bay areas of the warehouses. In some cases this waste of space has been reduced by cantilevering the storage rack structure out over the buffer stations, but at the expense of substantially increased cost. Also the duplication of buffer stations and transfer means for each pair of input and output storage racks has involved undue expense in prior rack storage systems.

SUMMARY OF THE INVENTION

According to the present invention, a segment of the conveyor itself is movable laterally from its normal location in the conveyor line to a buffer station located in the adjacent end of an aisle, this segment serving both as a transfer car and as a buffer station load support, for both inputting and outputting articles. Thus duplication of equipment for input and output is avoided, and the transfer car and buffer station mechanism is simplified, all of which contribute to a substantial reduction in cost. By locating the buffer station in the end of the aisle, moreover, the storage racks can be extended throughout the full length of the high bay area of the warehouse and the waste space referred to above is eliminated.

The operation can be programmed if desired so that each trip of the transfer car from its normal location to the buffer station inputs one article into the storage system, and so that the transfer car receives a second article from storage before leaving the buffer station and its return trip to its normal location in the conveyor line outputs the second article.

To accomplish these objectives, a segment of the roller conveyor is detached from the conveyor sections on either side thereof and is mounted on supporting wheels rotatable about axes parallel with the direction of conveyor movement. To make the segment self-propelled, a suitable electric motor and reduction gear can be used to drive the supporting wheels so that the segment then moves laterally out of the conveyor line toward the adjacent end of one of the aisles of the rack storage system. In order that the segment may function properly in the conveyor line as well as in the buffer station to be described, the rollers forming the top surface of the segment are motorized and driven in the appropriate direction to move articles along the conveyor. When the segment or transfer car moves laterally into the buffer location in the end of the aisle, it stops between an input storage bin in the rack on the side of the aisle toward which the rollers tend to deliver articles, and an output storage bin in the rack on the other side of the aisle. Both of these bins are provided with rollers or the like to facilitate movement of articles therein. When the transfer car delivers a load into the input storage bin, it moves into the bin on these rollers until its movement is limited at a desired position.

At the output storage bin on the other side of the transfer car, suitable power-actuated pusher means are provided to push an article out of the storage bin on its rollers and onto the transfer car rollers. As soon as the discharge of this article from the output storage bin to the transfer car has been completed, then the motor drive to the supporting wheels of the transfer car is actuated again so as to return the car to its normal location in the conveyor line where the article is picked up and moved away along the conveyor line.

BRIEF DESCRIPTION OF THE DRAWINGS

One embodiment of the invention has been illustrated somewhat diagrammatically in the accompanying drawings, but it is to be understood that said drawings are for purposes of illustration only and that the invention is not restricted to this embodiment.

In said drawings,

FIG. 1 is an elevation showing part of one end of a storage rack system with a transfer car in the buffer location at the end of one access aisle, this view being taken on the line of 1—1 of FIG. 2;

FIG. 2 is a plan view of FIG. 1, taken on the line 2—2 of FIG. 1;

DESCRIPTION OF THE PREFERRED EMBODIMENT

Figure 6:
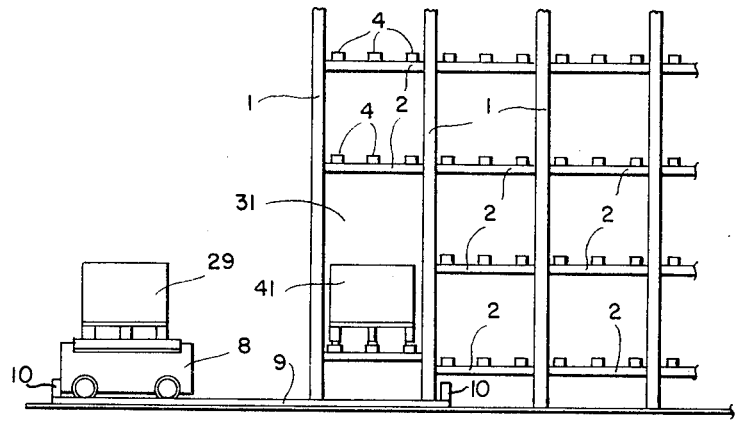
FIG. 6 is a side elevation showing a part of one of the storage racks of FIG. 1, together with a transfer car and the open end of an output storage bin.

In the preferred embodiment illustrated in the drawings, the storage racks may be of any suitable construction but usually comprise a more or less open framework of metal fabricated out of metal angle irons, beams and the like. FIG. 1 shows the ends of four such storage racks each comprising uprights 1 connected by horizontal frame members 2 to form rectangular bins for the storage of the desired articles or loads. The open ends of these bins face on access aisles indicated generally at 3A and 3B in a sort of honeycomb-like or pigeon hole arrangement as shown in FIG. 6. The load supporting structure in each bin, in the case of the usually palletized loads, may suitably comprise sets of supports 4 corresponding in number and arrangement to the pallets, the bottom of each bin being otherwise open. It will be understood from the above brief description of rack storage systems of this type that suitable stacker crane mechanism is movable horizontally along each of aisles 3A and 3B and is also movable vertically to the level of any desired storage bin in the rack so that any of the storage bins indicated in part by FIG. 6 can be serviced in a known manner. While such a stacker crane is shown in block outline form at CR in aisle 3B only, it should be understood that a similar crane is also operationally disposed in aisle 3A, but not shown in order to simplify the drawing. Since stacker crane mechanisms are well known, the details of crane CR and its suspension have not been illustrated in the drawing.

Articles or loads to be stored, usually palletized, are conveyed to the rack storage system by a conveyor line 5, in FIG. 2. This conveyor line is comprised of a plurality of contiguous segments, and extends across the ends of the storage racks and intermediate access aisles, and at points aligned with each access aisle certain segments of the conveyor are separate from the segments of the conveyor on either side so as to provide the laterally movable transfer cars referred to above. As shown in FIG. 2, one such laterally movable segment 7 has been moved from its normal location between fixed segments 5A and 5B in the conveyor line to the buffer location in the end of adjacent aisle 3A, whereas another such laterally movable segment 8 remains in its normal location between fixed segments 5B and 5C in the conveyor line. Lateral movement of these conveyor segments or transfer cars 7 and 8 is preferably guided by suitable means such as rails 9, on which the cars run, the movement of the cars in either direction being limited by stops 10 at the ends of the rails.

Each of the segments (5A, 7, 5B, 8 and 5C) of the conveyor line 5 is provided with suitable movable supporting and article conveying means, for example rollers as illustrated in the drawing. In each of segments 5A, 5B and 5C, a row of adjacent parallel rollers R extends from one end of the segment to the other end of the segment, while in each of the segments 7 and 8 a row of parallel rollers 13 extends from one to the other end of the segment.

Figure 7:
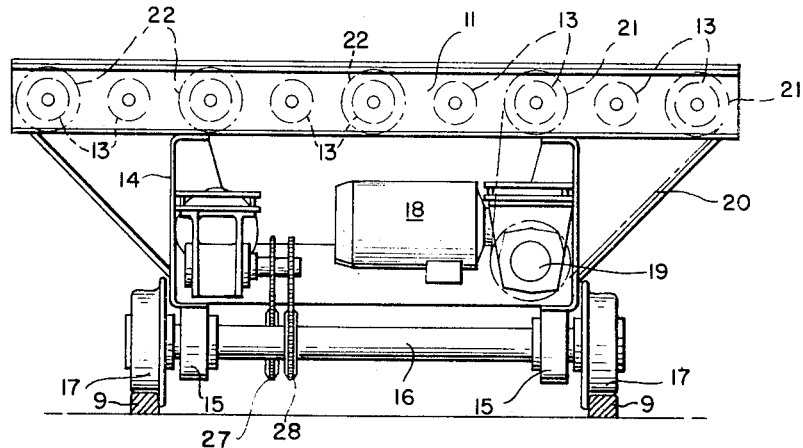
FIG. 7 is a detailed side elevation of the transfer car.
Figure 8:
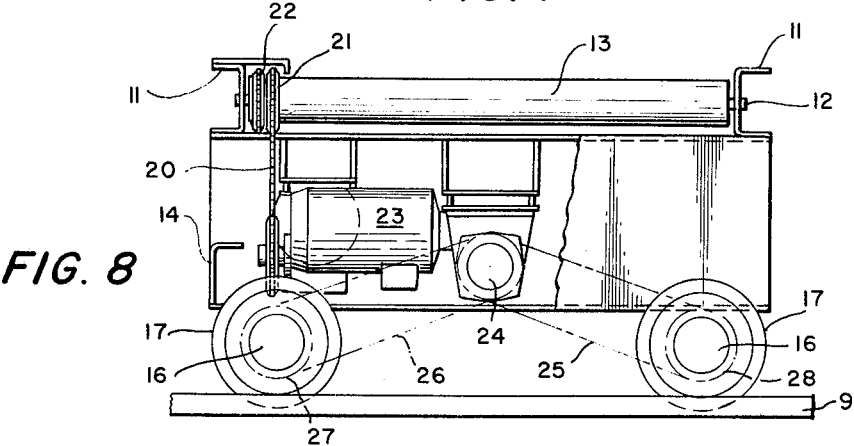
FIG. 8 is a detailed side elevation of the transfer car taken at right angles to FIG. 7.

The details of a suitable transfer car construction are shown in FIGS. 7 and 8. Referring to these figures, side rails 11 serve to carry the projecting ends 12 of the axles of rollers 13 which constitute part of the roller conveyor 5 as long as the transfer car occupies its normal position in the conveyor line, as in the case of car 8 in FIG. 2. These rollers 13 are motorized by a source of power mounted on the transfer car so that they can be energized and rotated to move articles along the conveyor line 5 and also to perform the functions described hereinafter when the segment or car is at its buffer station in the end of the adjacent aisle, as in the case of car 7 in the end of aisle 3A in FIG. 2. As shown, the side rails 11 are carried by any suitable supporting framework 14 having journal bearings 15 for the axles 16 of supporting and driving wheels 17 which run on the tracks 9 as already described. Suitable brackets on this supporting framework serve to carry an electric motor 18 (FIG. 7) and a reduction gear 19 which drives a chain 20 passing around drive sprockets 21 on one or more of the rollers 13. In order to drive any desired number of additional rollers 13, they are connected together by a chain running around sprockets 22, and as shown in FIG. 7, every other roller of the segment 7 is a driven roller. The direction of rotation of the rollers 13 corresponds to the direction of movement of articles and loads on the conveyor, 5, i.e., from left to right as seen in FIG. 2.

It should be understood that suitable structure (not shown) supports the fixed segments 5A, 5B and 5C of the conveyor line 5, to match the level of the laterally movable segments 7 and 8 to provide continuity of the conveyor line 5 when segments 7 and 8 are in their normal positions. Rollers R of the fixed segments 5A, 5B and 5C are motorized, for example in the same manner as rollers 13 of the laterally movable segments (transfer cars) 7 and 8.

In order to provide for lateral movement of a transfer car from its normal location in the conveyor line to its buffer location in the adjacent end of an aisle 3, the supporting framework 14 may also carry an electric motor 23 (FIG. 8) and a reduction gear 24 which drives chains 25 and 26 passing around drive sprockets 27 and 28 on the ends of the axles 16 of the supporting drive wheels 17. It will be evident that through suitable controls for electric motors 18 and 23, either the drive wheels 17 of the transfer car, or the rollers 13 thereof, or both, can be operated at any desired time and in any desired sequence.

When a transfer car (such as 7) is about to move out of the conveyor line to the buffer location shown on the left-hand side of FIGS. 1 and 2 with a load 29 thereon, the rollers 13 will be deenergized so that the load remains in place while the motor 23 is energized to cause lateral movement of the car and load. At the buffer station, where the lateral movement of the car is limited by the stops 10 as shown in FIG. 2, the motor 23 is deenergized and the load 29 is positioned between an input storage bin 30 on its right-hand side as seen in FIG. 1 and an output storage bin 31 on its left-hand side. At this buffer station, when the motor 18 is energized, the rollers 13 cause movement of the load 29 to the right as seen in FIGS. 1 and 2 into the input storage bin. In this bin, the load preferably travels on rollers; as shown (FIGS. 1, 2, 3 and 4), it is supported by pairs of rails 32 (shown as three in number to correspond with the pallet) between which rollers 33 are mounted. Movement of the load into the storage bin on the rollers 33 may continue until the load comes up against stops or buffers as shown at 34, and in order to insure movement of the load to this final position, the rails 32 of the input storage bin are preferably inclined downwardly (left to right in FIG. 1) to some extent for gravity assist.

In case only a partial load or a smaller sized article is to be stored, it may be desirable to provide a limiting stop or stops movable into position at points reached by the load before the stops 34. As shown by way of example (see particularly FIG. 4) a power cylinder 35 (pneumatic, hydraulic, etc.) is pivotally mounted at 36 on bracket 37 below the middle pair of supporting rails 32 and its extendable piston rod is pivotally connected at 38 to any suitable system of levers 39 such that the stop member 40 can be raised from the depressed position shown in full lines in FIG. 4 to the intermediate stop position shown in dot and dash lines in FIG. 4.

Figure 3:
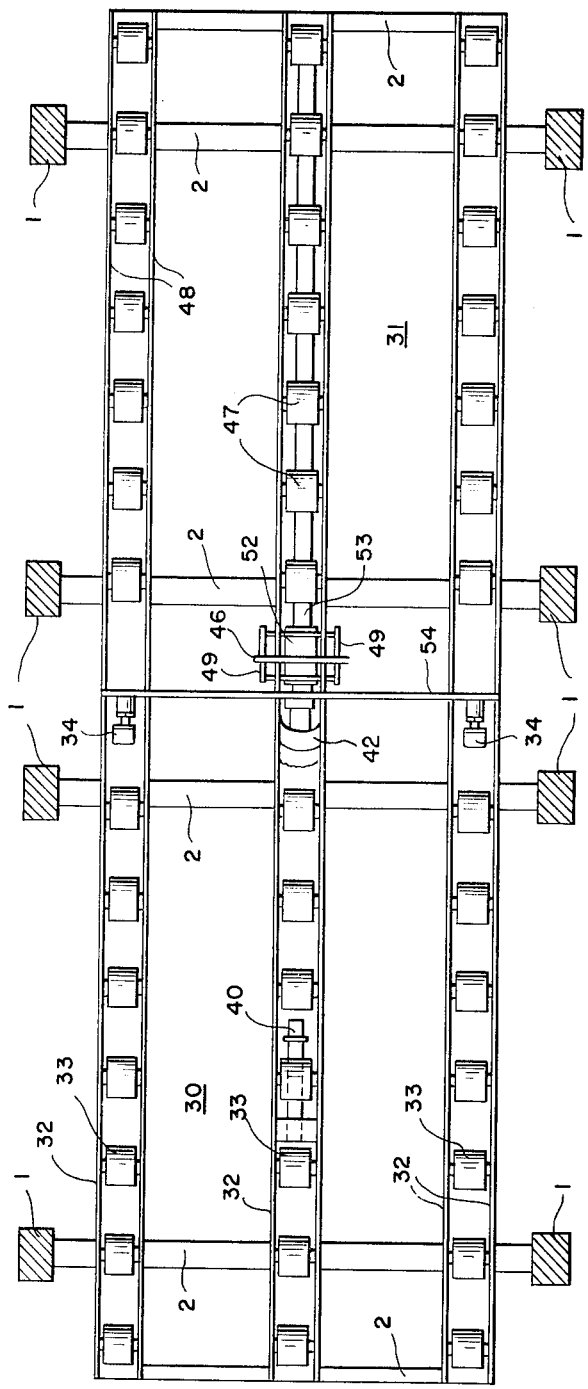
FIG. 3 is a plan view showing input and output storage bins arranged back to back in storage racks and opening out into access aisles on either side of said adjacent racks.
Figure 4:
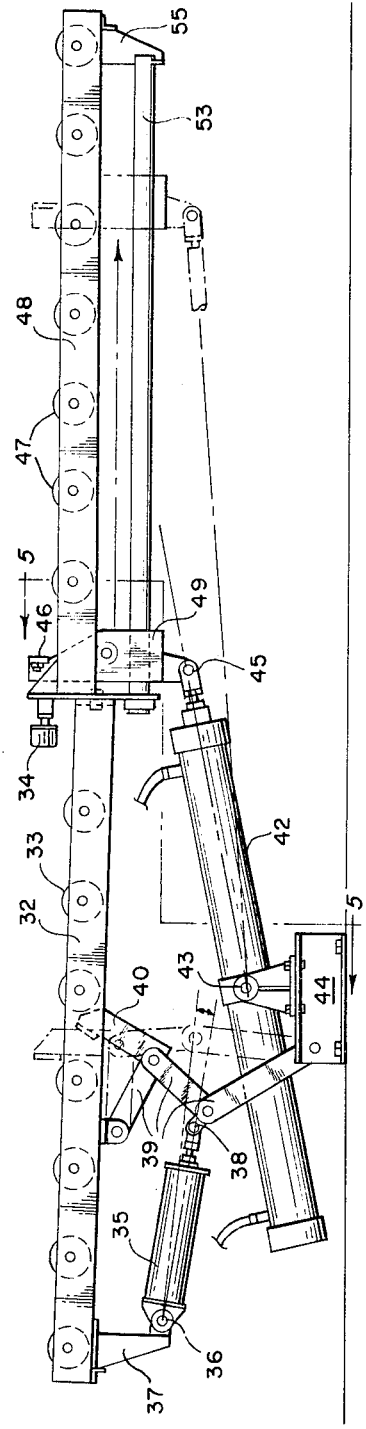
FIG. 4 is an elevation showing the input and output storage bins of FIG. 3 and associated load-handling means.
Figure 5:
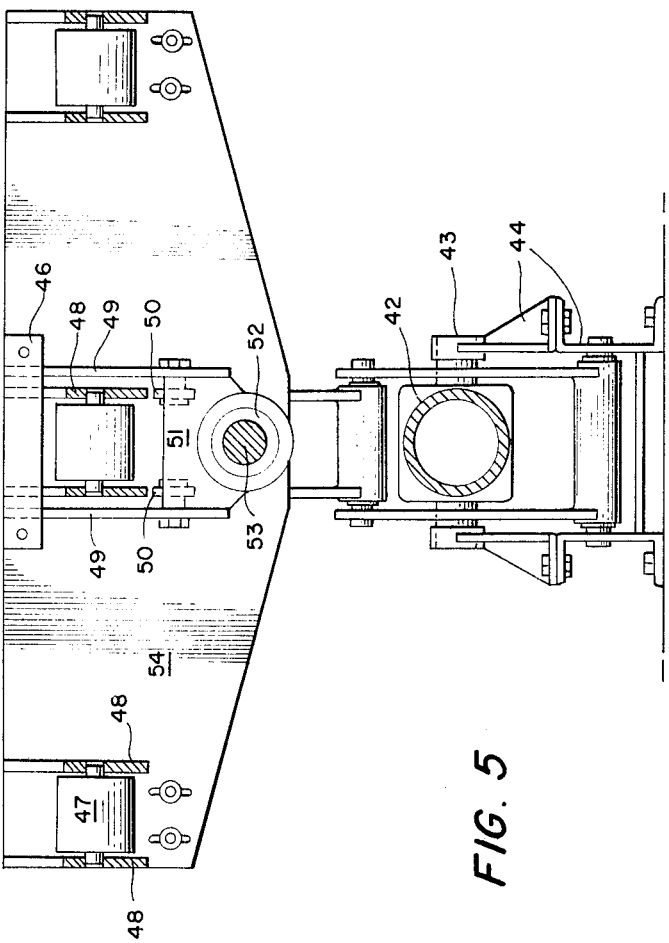
FIG. 5 is a sectional elevation taken on the line 5—5 of FIG. 4.

At the output storage bin 31, as briefly stated above, suitable power actuated pusher means are provided to push an article or load 41 out of the storage bin and onto the rollers 13 of the transfer car. These pusher means may take any suitable form and be actuated by any desired source of motive power. For example, as shown in FIGS. 4 and 5, a pneumatic cylinder 42 is pivotally mounted at 43 in a bracket structure 44, and its extendable piston rod is pivotally connected at 45 to a horizontally movable structure including a pusher bar 46 adapted to engage the load 41 and move it to the right as seen in FIG. 1 out of the output storage bin and onto the rollers 13 of the transfer car. It will be seen that the range of movement of the pusher bar 46 need be sufficient only to move the forward end of the advancing article onto the rollers 13, since these motorized rollers will then take over and pull the load out of the storage bin.

The details of construction of the output storage bin may take any suitable form, preferably with rolling support for the load. As shown, the article or load is supported by rollers 47 mounted between three pairs of rails 48 similar to the rails 32 of the input storage station. The pusher bar 46 may suitably be mounted on the upper ends of a pair of side plates 49 which straddle the center pair of rails 48. Rollers 50 may be mounted on these side plates 49 in position to roll on the lower edges of the rails 48. The lower ends of the side plates 49 are connected by a bracket structure 51 carrying a suitable collar or sleeve 52 that is slidable on a guide rod 53 extending horizontally between a plate or bracket 54 between the input and output storage stations and a bracket 55 adjacent the discharge end of the output storage bin. It will be seen that when the cylinder 42 extends its piston rod under pneumatic or hydraulic pressure, the structure comprising the pusher bar 46, side plates 49, bracket structure 51 and collar 52 moves horizontally along the rails 48 and guide rod 53 from the position shown in full lines in FIG. 5 to the position shown in dotted lines, thereby moving the load 41 out at least far enough that its forward end rests on the rollers 13 of the transfer car.

It will be understood that the above described transfer car buffer system can be controlled by hand or programmed automatically in any suitable way. A preferred method of operation is that already mentioned in which the movement of a transfer car such as car 7 to its buffer location serves to input a load and the return movement of the transfer car to its normal location in the conveyor line serves to output another load. In this method of operation, the transfer car conveyor rollers are stopped with a load thereon by deenergizing the motor 18 and the motor 23 is energized to move the car laterally from the conveyor line to its buffer location. Meanwhile, the stacker crane mechanism CR has deposited a load in the output storage bin 31. If need be, especially where loads are moving in close succession along the conveyor line, the loads immediately upstream of the transfer car may be held up either by actuating mechanical stops or by deenergizing the rollers of conveyor segments upstream of the transfer car. Controls for these actions may be coordinated, for example by programmed computer control, with control of transfer car actions, and even with commanded movements of the stacker crane.

On arrival at the buffer station, the motor 23 is deenergized and the motor 18 is energized to drive the conveyor rollers 13 so that the load carried by the transfer car starts to move into the input storage bin 30. After this movement has begun, but before the load reaches the limiting stop or stops, the pusher mechanism at the output storage bin is actuated and the pusher bar 46 moves the load out of the bin partially onto the transfer car rollers simultaneously with the movement of the input load partially off of these rollers and into the input storage bin 30. In other words, these two actions can take place substantially simultaneously. As soon as they have been completed and the input load has left the transfer car while the output load is in position on the transfer car, then motor 18 is deenergized to stop the drive rollers and motor 23 is energized to move the transfer car back to its normal location in the conveyor line. At this point, of course, motor 23 is again deenergized and the motor 18 is energized to start the movement of the output load down the conveyor line.

Transfer car buffer systems of the type illustrated by the foregoing specifically described embodiment provided substantial improvements in the art. In the first place, they eliminate the wastage of storage space above previous buffer stations in the high bay area of the warehouse. In the second place, they eliminate previous duplication of equipment by using a single device or apparatus for both inputting and outputting loads. Furthermore, the simultaneous discharge of an input load from the car and delivery of an output load to the car and the transportation of loads on both trips of the transfer car result in maximal utilization of equipment. These improvements are achieved with the use of equipment that is simple and inexpensive both to construct and to operate.

While only one embodiment of the invention has been described with particularity, it will be evident to those skilled in the art that other embodiments can be devised, and that various changes can be made in the form, details of construction, and arrangement of parts, without departing from the spirit of the invention.

I claim as my invention:

1. In a storage system having parallel storage racks extending along and facing each other across an aisle, said racks each having a plurality of storage spaces facing the aisle, the combination therewith of an input station in one of said racks on one side of the aisle and an output station in the other rack on the opposite side of the aisle, said stations facing the aisle, a conveyor system for conveying articles along a path in a generally horizontal direction crosswise to and past one end of said aisle, said conveyor system having a segment normally located in said path and including motorized article-moving means operable to engage and impart motion in said generally horizontal direction to articles conveyed by said conveyor system, said segment being movable from its normal location in said path into said aisle between said racks for access to said stations and vice versa whereby articles may be carried by said segment from said normal location to said input station and from said output station to said normal location, said motorized article-moving means being operable to impart motion to articles toward said input station and from said output station when said segment is in said aisle, and article carrier means movable in said aisle, said carrier means having article transfer means for: loading and unloading articles into and out of said storage spaces; loading articles into said output station; and unloading articles from said input station.

2. A storage system as defined in claim 1, said segment of the conveying system comprising a self-propelled car having motor-driven wheels, and guide tracks on which said wheels run, said tracks extending from said normal location into said aisle and alongside said stations.

3. A storage system as defined in claim 1 wherein said motorized means comprises a plurality of substantially parallel article-supporting rollers having their axes generally at right angles to said path when the segment is in said normal location, and motor means for rotating said rollers on their axes.

4. A storage system as defined in claim 1 wherein, said input station comprises rolls for supporting an article moving thereinto from said segment, said rolls being arranged to provide a downwardly inclined path whereby said article is assisted by gravity as it is received by said input station, and stop means for limiting travel of said article down said path.

5. A storage system as defined in claim 4, including stop means adjustable from a non-limiting to a limiting position.

6. A storage system as defined in claim 1 wherein, said output station comprises rolls for supporting an article therein, and power means for moving said article on said rolls out of said output station and at least partially onto said segment.

7. A storage system as defined in claim 6 wherein, said power means comprises a horizontally movable pusher element and a source of power for moving said pusher element to move said article out of said output station.

8. In a storage system having an aisle and first and second parallel storage racks facing each other across the aisle, each rack having a plurality of storage spaces facing the aisle, each rack having opposite ends horizontally spaced along said aisle, the combination therewith of an input station in one end of one of said racks, an output station in the corresponding end of the other rack whereby said stations face each other across the aisle, a generally horizontal conveyor system for conveying articles in a generally horizontal direction along a line lying crosswise of the longitudinal axis of said aisle and passing outside said one end of said racks, said conveyor system having a plurality of contiguous segments disposed along said line, one of said conveyor segments being movable laterally whereby it may be moved from its normal location between the immediately adjacent segments fore and aft thereof, said movable segment having motorized article-moving means operable to engage and impart motion to articles in said direction, guide means engaging said movable segment for restrictively guiding that segment along a fixed path extending laterally from the conveyor line toward and into said aisle, said movable segment being dimensioned to fit in the aisle between said input and output stations, said article-moving means being operable to impart motion to articles in the direction from said output station toward said input station when said movable segment is in said aisle, and article carrier means movable in said aisle, said carrier means having article transfer means for: loading and unloading articles into and out of said storage spaces; loading articles into said output station; and unloading articles from said input station.

9. The combination as in claim 8 wherein said motorized means comprises a row of substantially parallel motorized rollers, said row extending along the line of article movement when said movable segment is in its normal location in said conveyor system.

10. The combination as in claim 9 wherein conveyor segments other than said movable segment also have motorized means for engaging and imparting motion to articles in said generally horizontal direction.

References Cited

UNITED STATES PATENTS 3,182,823   5/1965   Chasal _____ 214—16.4

GERALD M. FORLENZA, Primary Examiner

R. B. JOHNSON, Assistant Examiner

U.S. Cl. X.R.

198—31